Figure 1:
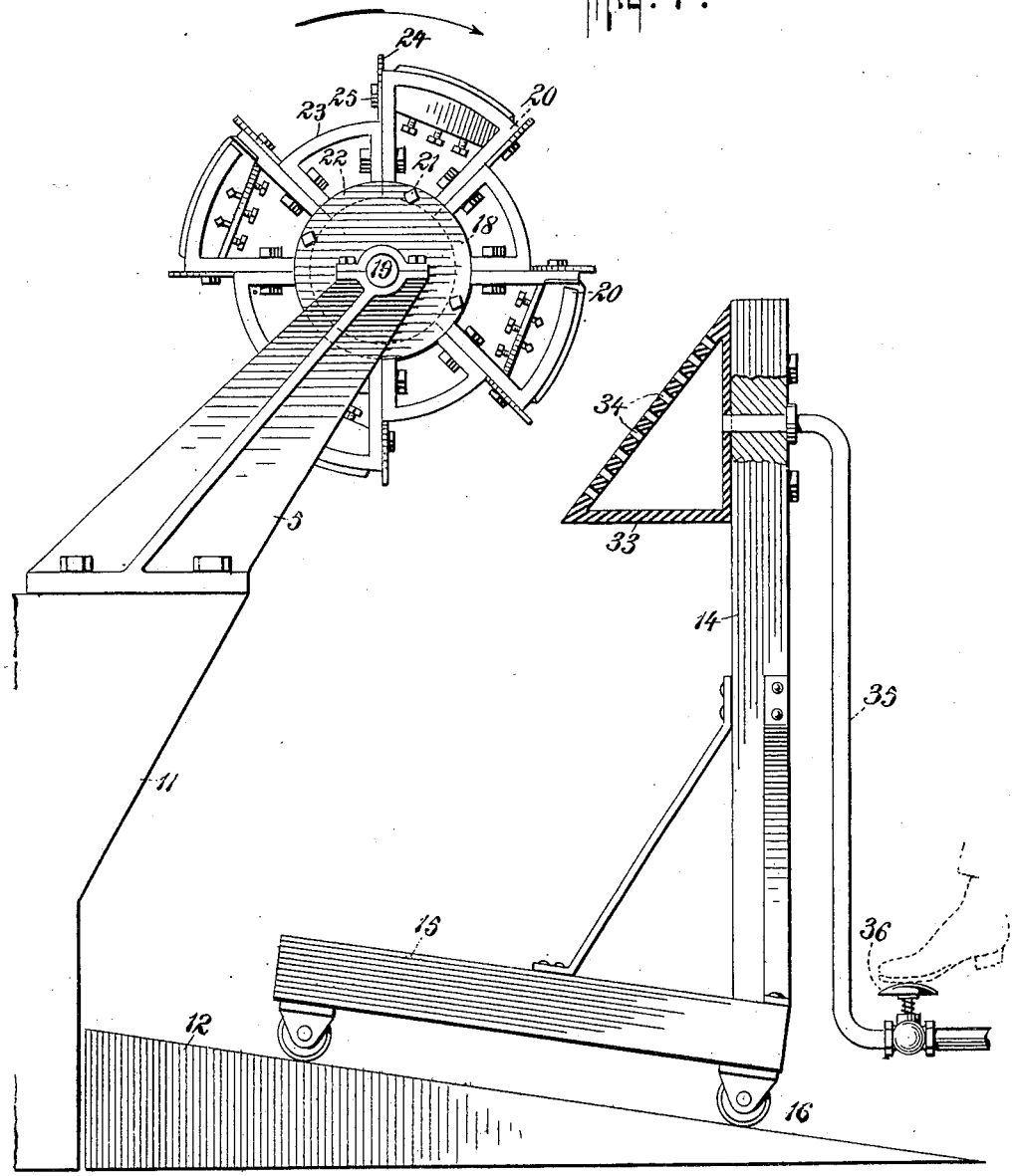

M. WHITLATCH.
MACHINE FOR THE TREATMENT OF PELTS.
APPLICATION FILED NOV. 23, 1907.

909,977.

Patented Jan. 19, 1909.

2 SHEETS—SHEET 1.

WITNESSES

INVENTOR
Marshall Whitlatch
BY
ATTORNEYS

M. WHITLATCH.
MACHINE FOR THE TREATMENT OF PELTS.
APPLICATION FILED NOV. 23, 1907.
909,977.
Patented Jan. 19, 1909.
2 SHEETS—SHEET 2.
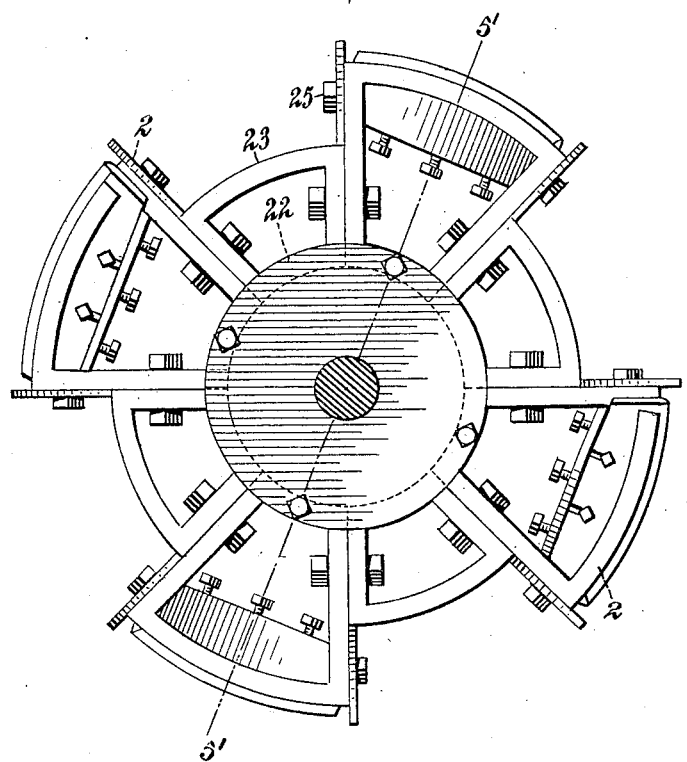
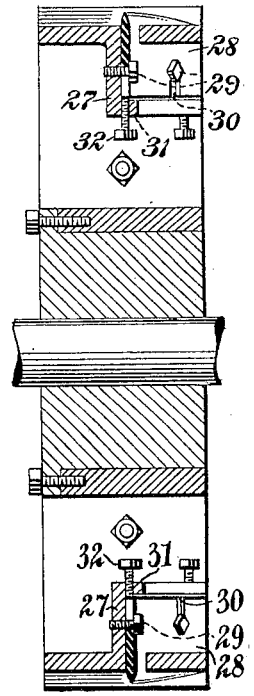
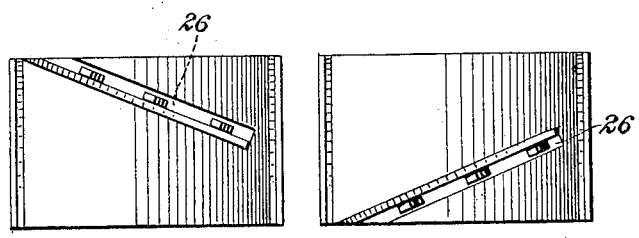
WITNESSES
INVENTOR
Marshall Whitlatch
BY Gifford & Bull
His ATTORNEYS

UNITED STATES PATENT OFFICE.

MARSHALL WHITLATCH, OF MONTCLAIR, NEW JERSEY, ASSIGNOR OF ONE-HALF TO CHARLES E. VAN VLECK, OF MONTCLAIR, NEW JERSEY.

MACHINE FOR THE TREATMENT OF PELTS.

No. 909,977.     Specification of Letters Patent.     Patented Jan. 19, 1909.

Application filed November 23, 1907. Serial No. 403,483.

*To all whom it may concern:*

Be it known that I, MARSHALL WHITLATCH, a citizen of the United States, and a resident of the city of Montclair, in the county of Essex and State of New Jersey, have invented certain new and useful Improvements in Machines for the Treatment of Pelts, of which the following is a specification.

When it has been desired to remove from a pelt flesh or other matter adhering thereto, great difficulty has been encountered in devising means for performing this operation rapidly and efficiently and without injury to the pelt; the greatest danger of injury to the pelt being that of cutting, whereby the pelt may be ruined and it has therefore been desired to produce a machine whereby sharpened flesher members may be readily used without such danger.

It is my purpose to provide a machine whereby fur pelts may be fleshed or cleaned rapidly and with safety, the pelt being properly positioned at all times and presenting a desired degree of firmness under the operation of the flesher members; the fatty matter or tissue adhering to the inner side of the pelt being roughened and loosened before the operation of the flesher blades in such a manner as to facilitate said operation.

In addition to the novel features of design, construction, combination, and arrangement of parts, my machine possesses the advantages of simplicity and durability of construction and ease of operation.

For the purpose of illustration I have shown and described a preferred form of machine embodying my invention, but I do not wish to limit myself to any such particular form, my invention consisting in the construction, combination and arrangement and operation of parts set forth in and falling within the scope of the claims hereto appended.

In the accompanying drawings like characters of reference denote like parts in all the figures.

Figure 1 represents a view in side elevation of my improved machine; Fig. 2 represents a view in side elevation of the beater and flesher wheel of my improved machine; Fig. 3 represents a vertical view in section taken on the line 5'—5' of Fig. 2; Fig. 4 represents a top view of the ends of two of the supporting members of my improved machine.

Turning now to a description of my invention in detail, in Fig. 1 is shown a preferred form of machine embodying my invention. The beater and flesher wheel comprises an enlarged hub 18, on axle 19, mounted on the periphery of which hub 18 are open frame wedge-formed supporting members 20, secured by bolts 21 to a flange 22 on the hub 18, and similar wedge formed spacing members 23 secured to adjoining members 20 by bolts. By inserting spacing members 23 of increased or diminished size the supporting members 20 may be spaced any desired distance apart, and a greater or smaller number of such members 20 may be mounted on the periphery of hub 18. Mounted transverse the ends of each of the supporting members 20 are square edged beater or roughener members 24, preferably in the form of flat metal plates adjustably secured by bolts 25 and projecting a desired distance above the surface of the end of supporting member 20 to which they are secured. The flesher and beater wheel is free to revolve on axle 19, said axle resting in bearings at the tops of two supporting arms 5, one on each side of the flesher and beater wheel, the supporting arms 5 being mounted on a stand 11. In front of and sloping up to stand 11 is placed a platform 12 for a purpose hereafter to be set forth. Motion is imparted to the beater and flesher wheel by means of a suitable pulley (not shown) mounted on one end of axle 19 and connected to any desired source of power.

Turning now to Figs. 2 to 4, the face of the end of each supporting member 20 is slotted diagonally for a desired distance from a point adjacent one of the rear corners thereof (wheel movement being in the direction of the arrow in Fig. 1) the slots 26 in successive members being from opposite corners (as shown in Fig. 4). Extending downward from the inside of the end of each supporting member 20 along one edge (alternate edges on successive members 20) of the slot 26 is a rib 27 having mounted thereon a flesher member 28 with its sharpened edge projecting through the slot 26 and curved to conform to the curve of the face of member 20. The member 28 is mounted on the rib 27 by means of bolts 29 passing into the rib 27 through slots 30 cut up from the bottom of the member 28; said bolts 29 being capable of adjustment to permit of the vertical adjustment of member 28. The lower edge of the member 28 rests on or is adjacent to a horizontal projection 31 of the rib 27; by means of thumb screws 32 passing through the projection 31 and bearing on the lower edge of the member 28 vertical adjustment of the latter may be effected, in order to project the sharpened edge thereof more or less above the end of the member 20 as desired.

Turning now to a further description of Fig. 1; upon a standard 14 is mounted a pelt support 33, preferably in the form of a triangular box with sloping face presented toward the beater and flesher wheel and provided with perforations 34. From the box member 33, preferably at the back through standard 14 as shown, suitable connection 35 leads to an air supply (not shown) which air supply may consist of a compressed air tank or may be by means of a force fan. The connection 35 is provided with a spring controlled valve 36, so placed that by pressure of the operator's foot thereupon a stream of air will enter box 33, through 35 and pass out through perforations 34. This is for the purpose of forcing a pelt placed on the member 33 into yielding contact with the beater arms and flesher members as will hereafter be more particularly described. The standard 14 is mounted on a base 15 provided with wheels 16.

The operation of my improved machine is as follows: It being desired to clean the inside of a pelt of fatty matter, tissue, flesh or the like, adhering thereto, and to at the same time stretch the pelt, it is placed over the support 33, with the inner surface up and held at the top of the support in a desired position by the operator. The beater and flesher wheel having been set in motion, the support 33 is advanced toward the same by moving its standard and base forward upon the platform 12, and a current of air is released passing through the perforations 34 and uniformly pressing the pelt up toward and against the beater and flesher members with a degree of force corresponding to the advancement of the support toward the wheel and to the strength of the current of air. As each beater or roughener member or arm 24 comes in contact with the pelt it draws the pelt downward, presenting an even surface to the action of the following flesher blade and keeping the pelt from a too intimate contact therewith, thereby preventing the cutting or marring of the pelt. At the same time the square edge of the beater or roughener member being drawn rapidly over the fleshy matter, tissue, etc., adhering to the pelt, roughens and loosens the same, thereby providing a firm hold for the following flesher blade and greatly facilitating the removal of the flesh etc. by reason of its loosened condition. The successive flesher blades being set at opposite angles the pelt is thoroughly cleaned. That portion of the pelt which is being treated having been cleaned to a desired degree a new portion may be brought into position by altering the position of the pelt.

It is thus seen that I have provided a machine whereby a pelt may be cleaned, the advantages incident to my device comprising the yielding support of pelts under the impact of beaters or rougheners and fleshers, the adjustability of the force of impact to any desired degree as a greater or less cleaning effect is desired, the protection of the pelts against injury while being cleaned, the speed and ease of operation, and the universal application of the device for the purposes of fleshing.

Having thus described my invention, what I claim as new and desire to secure by Letters Patent is:—

1. In a machine for the treatment of pelts, a pelt support, and means for fleshing a pelt placed on said support, said means comprising a flesher member and a square edged beater or roughener member adapted to contact with said pelt.

2. In a machine for the treatment of pelts, a flesher wheel adapted to be revolved, a flesher blade carried thereby and a square edged beater or roughener member mounted in advance of said blade.

3. In a machine for the treatment of pelts, a flesher wheel, a plurality of flesher blades mounted diagonally thereon, the successive blades extending in opposite directions, and a beater or roughener member located in advance of each blade.

4. In a machine for the treatment of pelts, a flesher wheel adapted to be revolved, and fleshing means and a square edged beater or roughener member carried by said wheel.

5. In a machine for the treatment of pelts, a flesher wheel adapted to be revolved, and a flesher blade and a plurality of square edged beater or roughener members carried by said wheel.

6. In a machine for the treatment of pelts, in combination, a flesher and scraper wheel adapted to be revolved, a support for a pelt to be operated upon, perforations in said support, and means for forcing a current of air through said perforations.

7. In a machine for the treatment of pelts, a pelt support, means for fleshing or scraping a pelt placed on said support, and means for brniging the pelt in contact with said fleshing or scraping means without movement of said support.

8. In a machine for the treatment of pelts, a pelt support, means for fleshing or scraping a pelt placed on said support, and means for controlling a flow of air adapted to bring the pelt in contact with said fleshing or scraping means.

9. In a machine for the treatment of pelts, in combination, a flesher and scraper wheel adapted to be revolved, a support for a pelt to be operated upon, and means for forcing the pelt from said support into contact with said wheel.

10. In a machine for the treatment of pelts, a pelt support, means for fleshing or scraping a pelt placed on said support and means for directing a flow of air adapted to bring the pelt in engagement with said fleshing means.

11. In a machine for the treatment of pelts, means for fleshing or scraping a pelt, said means comprising a plurality of blade members, and a plurality of beater members located in advance and in the rear of each of said blade members.

12. In a machine for the treatment of pelts, a pelt support, a fleshing blade adapted to operate to contact with a pelt placed on said support, a beater member adapted to contact with the pelt in advance of the blade, and a second beater member adapted to contact with the pelt following the blade.

In testimony whereof I have hereunto signed my name to this specification in the presence of two subscribing witnesses.

MARSHALL WHITLATCH.

Witnesses:
R. B. CAVANAGH,
T. E. HARDENBERGH, Jr.